US011361033B2

(12) United States Patent
Drost

(10) Patent No.: US 11,361,033 B2
(45) Date of Patent: Jun. 14, 2022

(54) SYSTEMS AND METHODS OF AUTOMATED DOCUMENT TEMPLATE CREATION USING ARTIFICIAL INTELLIGENCE

(71) Applicant: High Concept Software Development B.V., Deventer (NL)

(72) Inventor: Marco Drost, Deventer (NL)

(73) Assignee: High Concept Software Devlopment B.V., Deventer (NL)

( * ) Notice: Subject to any disclaimer, the term of this patent is extended or adjusted under 35 U.S.C. 154(b) by 0 days.

(21) Appl. No.: 17/024,196

(22) Filed: Sep. 17, 2020

(65) Prior Publication Data

US 2022/0083606 A1 Mar. 17, 2022

(51) Int. Cl.

| | |
|---|---|
| ***G06F 16/93*** | (2019.01) |
| ***G06N 20/00*** | (2019.01) |
| ***G06F 40/186*** | (2020.01) |
| ***G06N 5/04*** | (2006.01) |
| ***G06F 16/904*** | (2019.01) |

(52) U.S. Cl.

CPC ............ *G06F 16/93* (2019.01); *G06F 16/904* (2019.01); *G06F 40/186* (2020.01); *G06N 5/04* (2013.01); *G06N 20/00* (2019.01)

(58) Field of Classification Search

CPC ...... G06F 16/93; G06F 16/904; G06F 40/186; G06N 20/00; G06N 5/04

USPC .......................................................... 715/222

See application file for complete search history.

(56) References Cited

U.S. PATENT DOCUMENTS

| | | | | |
|---|---|---|---|---|
| 10,481,783 | B1 * | 11/2019 | Benkreira | G06F 3/0485 |
| 2002/0082857 | A1 * | 6/2002 | Skordin | G06F 40/174 705/1.1 |
| 2011/0252313 | A1 * | 10/2011 | Tanushree | G06F 16/36 715/255 |
| 2014/0215301 | A1 * | 7/2014 | Stone | G06F 40/186 715/225 |
| 2014/0316911 | A1 * | 10/2014 | Gross | G06Q 30/00 705/14.73 |
| 2015/0019569 | A1 * | 1/2015 | Parker | G06F 16/338 707/748 |
| 2016/0371246 | A1 * | 12/2016 | Deepak | G06F 40/186 |
| 2018/0225273 | A1 * | 8/2018 | White | G06F 3/04842 |
| 2019/0147028 | A1 * | 5/2019 | Hare | G06F 40/174 715/221 |
| 2019/0253431 | A1 * | 8/2019 | Atanda | G06F 21/62 |
| 2020/0334381 | A1 * | 10/2020 | Yarowsky | G06F 40/30 |
| 2020/0351310 | A1 * | 11/2020 | Leighton | G06F 21/6254 |

* cited by examiner

*Primary Examiner* — Hope C Sheffield

(74) *Attorney, Agent, or Firm* — Deepali Brahmbhatt; Devlin Law Firm LLC

(57) ABSTRACT

The systems and methods of creating document templates for a collection of documents, comprising: presenting a collection of documents for input processing; analyzing the collection of documents using an artificial intelligence processor; grouping documents for standardization to create one or more document templates; anonymizing the documents for General Data Protection Regulation (GDPR) compliance; creating a flow chart connecting parts for each of the document template wherein the document template includes: a header section, a footer section, and one or more body text sections; and wherein each section includes: one or more variables; one or more data fields; formatting style; and font style.

10 Claims, 18 Drawing Sheets

SYSTEMS AND METHODS OF AUTOMATED DOCUMENT TEMPLATE CREATION USING ARTIFICIAL INTELLIGENCE

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

FIELD OF THE INVENTION

The present invention is in the technical field of automated document template creation using artificial intelligence ("AI"). More particularly, the present invention is in the technical field of processing a large collection of documents to group them into same types of documents based on content similarities and create a document template with flow chart and questionnaire. More particularly, the present invention is in the technical field of providing an organization a visual graphic with a big picture view of different types of documents used within that organization and associated flow charts, document templates and questionnaires.

BACKGROUND

While document template creation exists, there are several problems that exist with traditional document template creation. The templates with question and answers, text blocks and other objects to let users create a perfect document have to be manually created. While techniques of mailmerge exist to send multiple documents that replaces different specific field, any complex document template management cannot be handled using mail merge. The templates are always created by specialists who had training and enough experience. It is time consuming to interview professionals who want to use (semi)automated documents in the first place and create the intelligent templates for them in the second place. It can take a week to several months to create enough relevant templates for an organization. The quality of the templates depends on the analytical and communicational skills of the consultant in the first place and the available time and skills of the interviewed professionals in the second place. And you cannot interview every professional in an organization. At law firms for example no lawyer wants to spend time on developing templates. Their hourly rate is too high to spend time on this and most of the lack the kind of analytical thinking that is needed for template development.

Specific implementations of productivity tools to enable more automation is too costly for smaller law firms or any other small or medium sized organization. The manual labor on developing templates is not efficient in many aspects for small organizations. For example, one template can cost 4 hours to 2 days for a consultant to create. Creating additional or full scope of templates used within an organization would require multiplying this number by order of hundreds. This becomes cumbersome when different employees have different formatting styles. For example, one employee may use the same content and subject matter using presentation documents whereas another may find using of word documents more useful. This problem is further exacerbated when an employee quits a corporation and another employee replaces him.

SUMMARY OF THE INVENTION

The present invention is systems and methods of creating document templates for a collection of documents, comprising: presenting a collection of documents for input processing; analyzing the collection of documents using an artificial intelligence processor; grouping documents for standardization to create one or more document templates; anonymizing the documents for General Data Protection Regulation (GDPR) compliance; creating a flow chart connecting parts for each of the document template wherein the document template includes: a header section, a footer section, and one or more body text sections; and wherein each section includes: one or more variables; one or more data fields; formatting style; and font style.

The systems and methods of creating document templates for a collection of documents, further comprising: receiving manual input to train the artificial intelligence processor.

The systems and methods of creating document templates for a collection of documents, further comprising: customizing document templates creation based on profiles within an organization.

The systems and methods of creating document templates for a collection of documents, further comprising: merging document templates based on information fields that match in content and have varying format or font style.

The systems and methods of creating document templates for a collection of documents, further comprising: generating questions to match the flow chart for a document template for user input.

The systems and methods of creating document templates for a collection of documents, further comprising: generating a visual graphics to display the collection of documents, groups of documents for standardization and document templates.

The systems and methods of creating document templates for a collection of documents, further comprising: allowing drag and drop revisions to the flow chart or document template.

The systems and methods of creating document templates for a collection of documents, further comprising: adding new documents to the collection of document after analyzing by the artificial intelligence processor is completed; analyzing the differences between the new documents and the document templates generated. The systems and methods of creating document templates for a collection of documents, further comprising: merging the differences by revising the flow chart or the document template.

The systems and methods of creating document templates for a collection of documents, further comprising: merging document templates having same content and varying document types.

BRIEF DESCRIPTION OF THE DRAWINGS

The embodiments of this invention are illustrated by way of example and not limitation in the figures of the accompanying drawings, in which like references indicate similar elements and in which.

DETAILED DESCRIPTION OF THE INVENTION

The present invention is systems and methods of creating document templates for a collection of documents, comprising: presenting a collection of documents for input processing; analyzing the collection of documents using an artificial intelligence processor; grouping documents for standardization to create one or more document templates; anonymizing the documents for General Data Protection Regulation (GDPR) compliance; creating a flow chart connecting parts for each of the document template wherein the document template includes: a header section, a footer section, and one or more body text sections; and wherein each section includes: one or more variables; one or more data fields; formatting style; and font style.

Generate automatically templates for at least 90% by using machine learning techniques and artificial intelligence. Input for this generation process are the documents that are made in the past by an organization. These documents are created by random professionals not just one. The analysis solution will capture the real content of the organization and standardizes this for the future to increase quality and productivity. The inventions herein leverages the knowledge and skills to develop the algorithms and artificial intelligence to solve this auto generation challenge of document templates. With the Artificial Intelligence solution the template is generated in 5 seconds. Any additional changes can be performed with manual review within minutes. This saves a lot of time.

The quality is better because the input can come from many users in the organization by using their documents that were created in the last year(s). The artificial intelligence processor does not show a preference or bias towards individuals or documents created by them. This allows access to documents all across the organization, resulting in the creation of the best document templates.

Before templates were created based on just a few example documents and by talking to a professional who uses the documents for his work. Now a template is based on hundreds or thousands of documents by the AI and results in a much more complete template and at least 10,000 times faster.

Providing a seamless document template architecture that works across different departments, different types of documents and with originating from different sources, in one embodiment. Different modules including automated collecting, analyzing, grouping, processing, creating of templates and flow charts, revising to finalize. In one embodiment, new files can be added for processing and differences are analyzed between the generated templates and the new added files. The feedback from the difference is then incorporated into the document templates.

The flow charts are associated with the document template and help visualization of the questionnaire and flow of information. A graphics interface that allows drag and drop edits or revisions is also incorporated.

Figure 1:
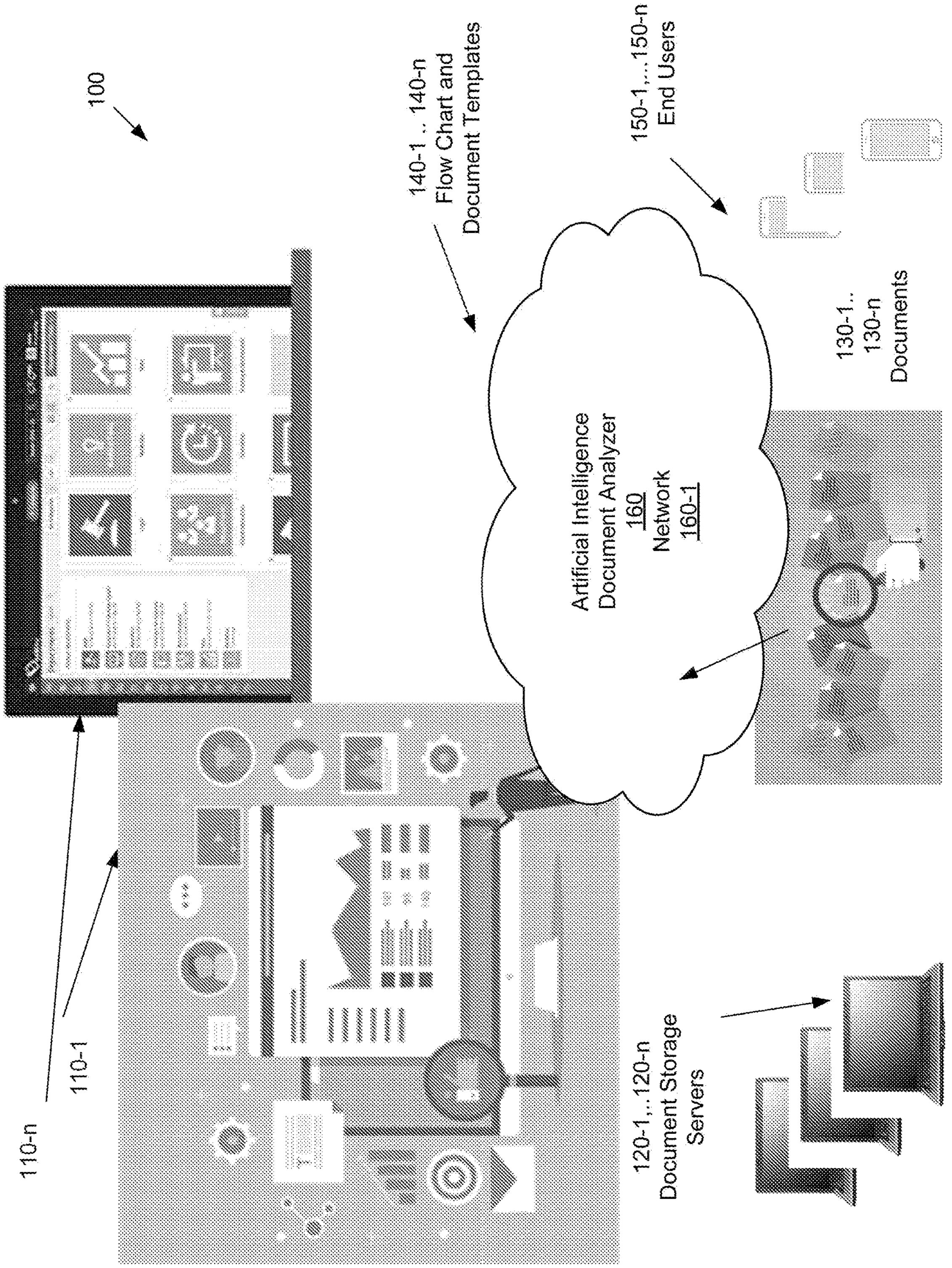
FIG. 1 shows a diagram illustrating an example of the systems and methods of creating document templates for a collection of documents with different types and categories of computing devices and varied document types at different departments from an organization.

In one embodiment, FIG. 1 depicts a diagram 100 illustrating an example of systems and methods of an artificial intelligence document analyzer 160 that is connected to different document sources in an organization. The artificial intelligence analyzer can be connected through a network 160-1 through departments 110-1 to **110-*n* computing devices connecting to end-users or consumers 150-1 to 150-*n* computing devices, document storage servers 120-1 to 120-*n* computing devices, with different types and categories of computing devices and varied documents 130-1 to 130-*n***.

In the example of FIG. 1, the environment includes departments that have varied computer systems and IT departments at 110-1 through an nth department **110-*n*, a distribution network 160-1, a set of document storage servers storing the documents 120-1 to 120-*n*, different documents originating from different employees in the different departments having variable parameters for each document at 130-1 to 130-*n*, and end-users at 150-1 to 150-*n* who may or may not have a computing device, i.e. a web-browser application or a mobile application that connects to the network 160-1. The artificial intelligence processor connects to these computing devices using the network 160-1. An end-user enjoys the benefits of the final versions from a smartphone, tablet or a laptop or personal computer 150-1**. The architecture disclosed herein provides for flexibility that allows different types of documents to originate from a department's central server or an employee's personal device, i.e. centralized storage or peer-to-peer based collection.

In an implementation, the department computing system 110 includes components related to network connectivity. In one implementation, the department computing system 110 includes hardware and software components to enable data-entry from different computing stations local to the department or remote. The role of the departments could be varied. For example, HR department has many documents that have personal sensitive information. This is in contrast to the marketing department wherein, the department may have more presentation documents with branding information that is also publicly available. In one embodiment, the documents may have different user inputs using word process or speech processing command. For example, one department, e.g. customer support, may be converting all support calls to written transcript documents.

In another implementation, the computing device 110 includes capability to directly communicate with the distribution network 160-1 to communicate with the artificial intelligence processor 160 that includes authentication and secure communication. The department 110 also includes capability to handle variety of documents in one implementation. In one implementation, the department 110 specializes in a specific document types, for example, presentations for marketing or spreadsheets for sales/accounting. Each clinic may be independent of the other and not in any way associated in terms of ownership, control or computer systems installed. In one embodiment, a group of clinics are associated with each other.

The role of the document storage servers 120-1 to 120-*n* computing devices is separated from the use of the computing devices at departments 110-1 to 110-*n*. While the document storage servers may reside within a department, many times such servers may be handled separately by an IT department, typically departments do not control the information technology or computer systems that exist. There may be issues of compatibility and different versions of the operating systems within a department. A document storage server freely associates with one or more departments. The document template creation described herein allows for uniformity across different departments and different employees to audit documents throughout the organization without adding cumbersome techniques of manual review. For example, the document storage system could be Microsoft Sharepoint, OneDrive or OpenText. Broadly speaking, the document template creation works irrespective of the level of computer system, i.e. some organizations may have more sophisticated computer systems and applications than those available at others.

In one embodiment, the documents generated after using the document templates are also stored at 120-1 to 120-*n*. These can include database that automatically tracks different fields and variables from the document templates.

The 130-1 to 130-*n* are different types of documents that may be categorized in different groups. The documents could be of different document types, for example, a claim chart can be in presentation format or a word format. An employee may have different preferences that differ from the preferences of another employee. The document template creation allows an individual autonomy while promoting the use of uniform documents that the organization policy requires. For example, some documents may have the same document type and content but different styles. Such differences can be discerned quickly through the artificial intelligence processor.

The output of the artificial intelligence processor are document templates, flow charts and questionnaires 140-1 to 140-*n*. The document template creation process creates a document template for each category of documents created. An organization can decide on the granularity level and map the flexibility to group certain documents together. The flow chart gives a visual representation of the document template. This process can be manually tweaked and the artificial intelligence processor can also learn incrementally with addition of new documents.

The artificial intelligence processor can also create a visual graphics that creates an output for all the different types of documents used within an organization. The associated document templates and flow charts are associated with different groups. This allows the management of an organization to quickly learn and get an insight into the underlying documents used by an organization. Such an overview would be helpful for statistical and analytical purposes.

For a document template creation to be implemented through the system, an end-user 150-1 to 150-*n* with computing device may access the finalized version through a central system through network 160-1 or through other user interfaces including client-side applications. The document template creation can automatically propagate throughout an organization for use. The end-user always gets the best possible options and a seamless experience. The management at an organization does not have to follow up on the use of the document templates when they are created and propagated in a seamless manner. If an end-user's work decreases with the use of the document template, the rate of adoption increases. The system can also detect fraud of end-users as well as stealing or copying of document templates. The system works seamlessly throughout the organization and can also provide competitive organizational data on performance and use within different departments as well as at employee level. The document data that can be anonymized for privacy concerns but can be very insightful for usage trends that feed into marketing, sales and promotions of different products. The organization overall becomes smarter with the use of the document template creation.

A person of ordinary skill in the art would appreciate that an organization that is a small business that does not have the resources to integrate different document template options or a highly sophisticated IT department with sophisticated software products can benefit. Many of these organizations reset their document policies yearly and any upgrades to any new systems many times involves losing information on documents and practices. The document template creation described herein can help an organization navigate seamlessly through those changes.

Network 160-1 can be different wireless and wired networks available to connect different computer devices including client and server systems. In an implementation, network 160-1 is publicly accessible on the internet through secure messaging protocol described herein. In an implementation, network 160-1 is inside a secure corporate wide area network. In an implementation, network 160-1 allows connectivity of different systems and devices using a computer-readable medium.

The messaging and notification between different components can be implemented using Application Programming Interface (API) calls, eXtensible Markup Language ("XML") or Javascript Object Notation ("JSON") config file interfaces between different interfaces, Hypertext Preprocessor (earlier called, Personal Home Page) ("PHP"), Python, Node.js, Java/C++ object-oriented programming or simple web-based tools.

Different components may also implement authentication and encryption to keep the data and the requests secure. Authentication of a device may be accomplished using public/private key, passwords, token, transaction, biometrics, multi-factor authentication or other methods known in the industry. Encryption may use data encryption standard (DES), TripleDES, Rivest-Shamir-Adleman (RSA) algorithm, Advanced Encryption Standard (AES) or other methods known in the industry.

Figure 2:
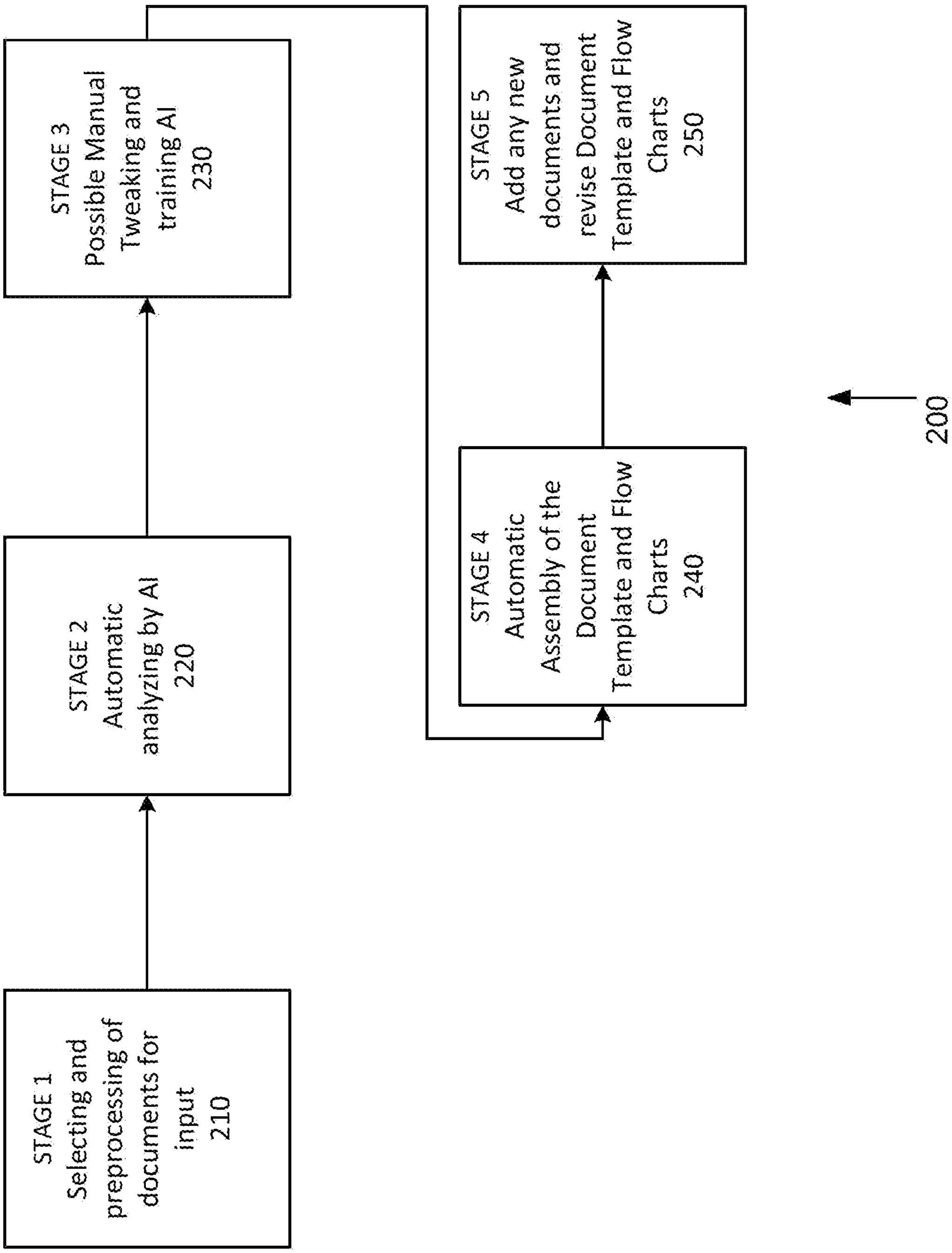
FIG. 2 shows different stages in automated document template creation using artificial intelligence, according to one embodiment.

FIG. 2 shows exploded view 200 of a computing device with different stages involved in the automated document template creation process described herein. There are five stages of the automated document template creation process described herein. The first stage, 210 is Selecting and preprocessing of documents for input. The second stage, 220 is automatic analyzing by AI. The third stage 230 is possible manual tweaking and training AI. The fourth stage 240 is automatic assembly of the document template in format for processor. The fifth stage 250 is adding new documents for input later and show differences with the template.

Figure 10:
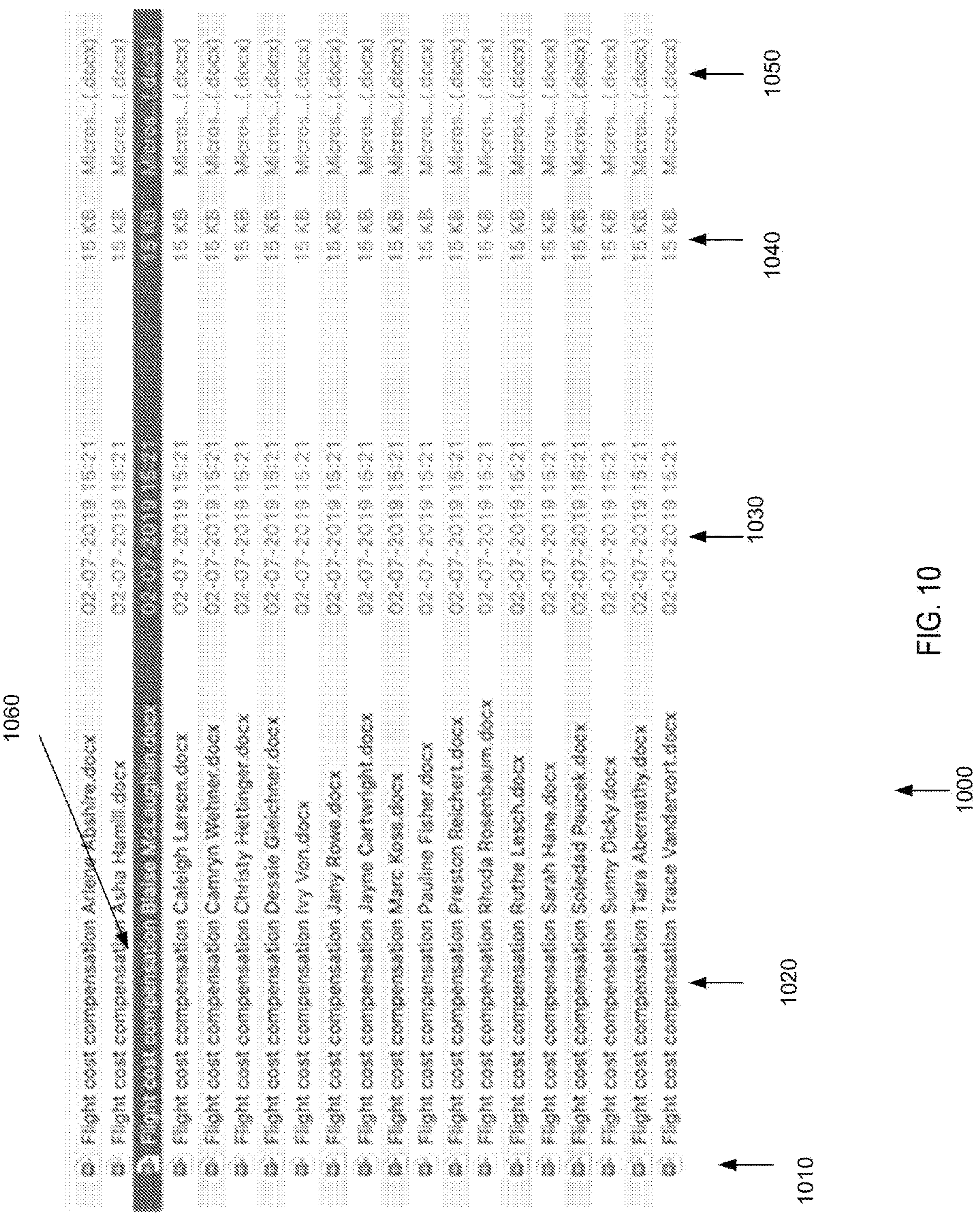
FIG. 10 is an example list of documents that are analyzed, according to one embodiment.

The stage 1, 210 for input for analysis is described here. The organization selects documents or document folders that are useful for analysis and standardization. The goal is to use the knowledge that was used in old documents, find patters, extract them and assemble these part into a document template for future new documents. The documents have to be uploaded to the Artificial Intelligence analytics tool and the tool recognizes the recurring texts, not recurring texts and special fields. For example, FIG. 10 is an example shown of a list of documents that are used to generate one template. It is a legal template to refund costs when a customer has a claim because of a flight cancellation or delay by an airline.

The preparation of the documents will be done in two steps. In the first step, because of GDPR it is important to anonymize the documents before they are processed by the AI in the cloud. The anonymization software has to be downloaded to the customer environment. The customer or a consultant that acts on behalf of the customer runs the software locally to analyze the documents on sensitive data. The software analyzes and shows as a result the fields that it has found that probably consists sensitive information. The consultant or operator of the software can select and deselect the fields that need to be replaced by dummy data. An extra option is that by selecting or deselecting fields the AI can be trained and analyze documents better again the next time. After selecting the preferred fields the documents will be processed and are now GDPR compliant.

In the second step, in the group of documents for processing there are many times header and footers that have small differences. These differences appear because of personal preferences of the authors. In this case the AI generates the result that there are many headers and footers. The consultant has the option to remove all headers and footers (when only the body text matters) or can select the preferred headers and footers and overwrite the others. With this preparation of the documents the outcome of the next stage will be of higher quality and GDPR compliant.

Figure 4:
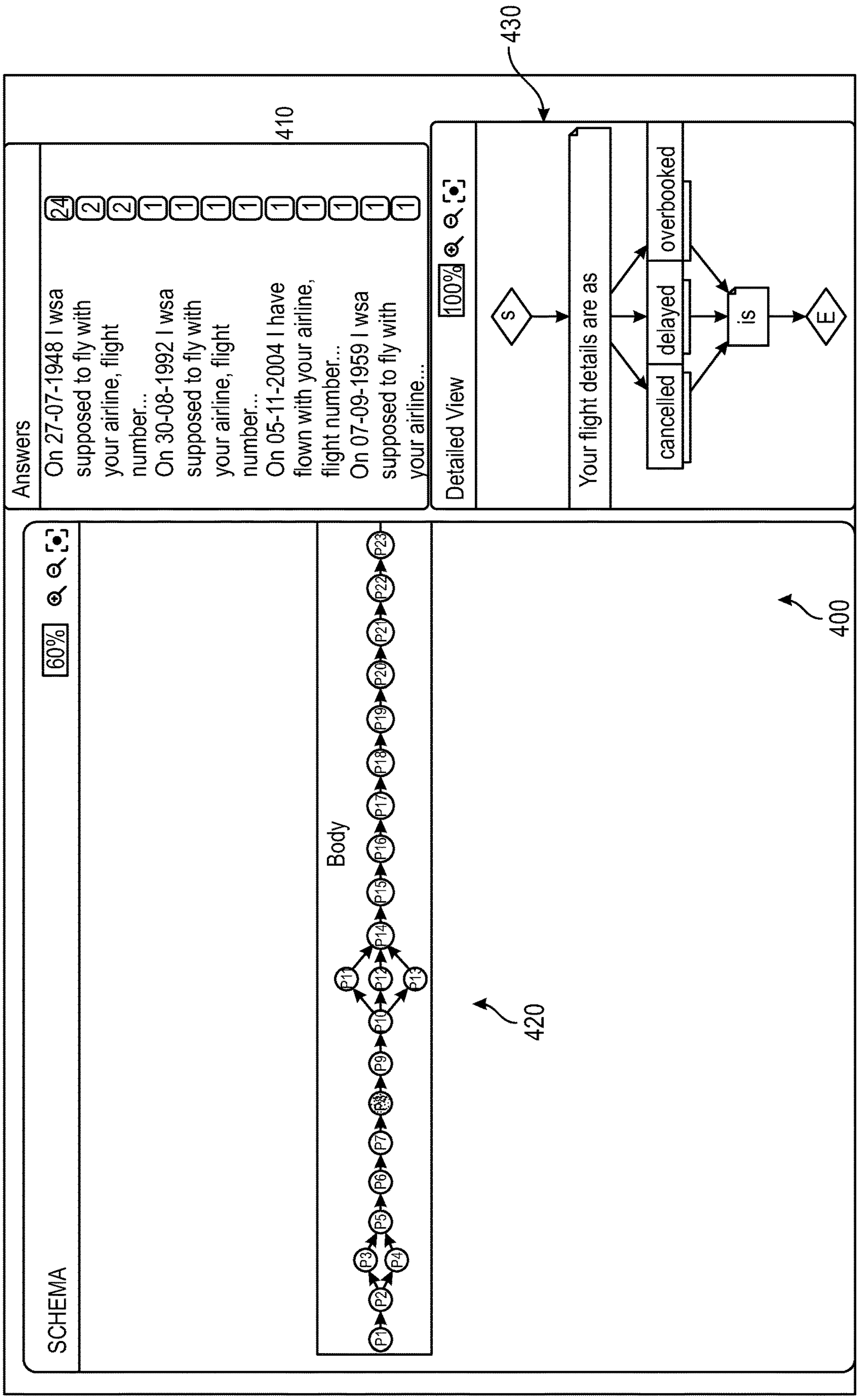
FIG. 4 is an example output generated by an artificial intelligence processor, according to one embodiment.

The stage 2, 220, Analysis by the AI can be described as follows. The Artificial Intelligence analytics tool divides multiple headers and footers from the body text. The body text is presented as a string of paragraphs. There can be multiple possibilities of a paragraph at the same position in the document as shown on the left side in the Smart AI picture, as shown in FIG. 4 at 420. Per paragraph there could be several subquestions which results in different outcome in the document. Example of the analysis by the AI of the previous list of documents is shown in FIG. 4.

The stage 3, 230 Possible manual tweaking and training AI can be described as follows. In the flow diagram with paragraphs the consultant can make adjustments. The consultant can merge paragraphs or split them as shown in the pictures (FIGS. 8, 9, 11 and 16). The flow diagram was built by the AI with usage of language models and a neural network for difficult (almost human) analysis. The consultant can feed the manual tweaks to the neural network so results of the AI can be better again next time. The training of the AI is also split into branch specific knowledge that we gather. For example, the knowledge of legal, government, medical and manufacturing branch.

Figure 8:
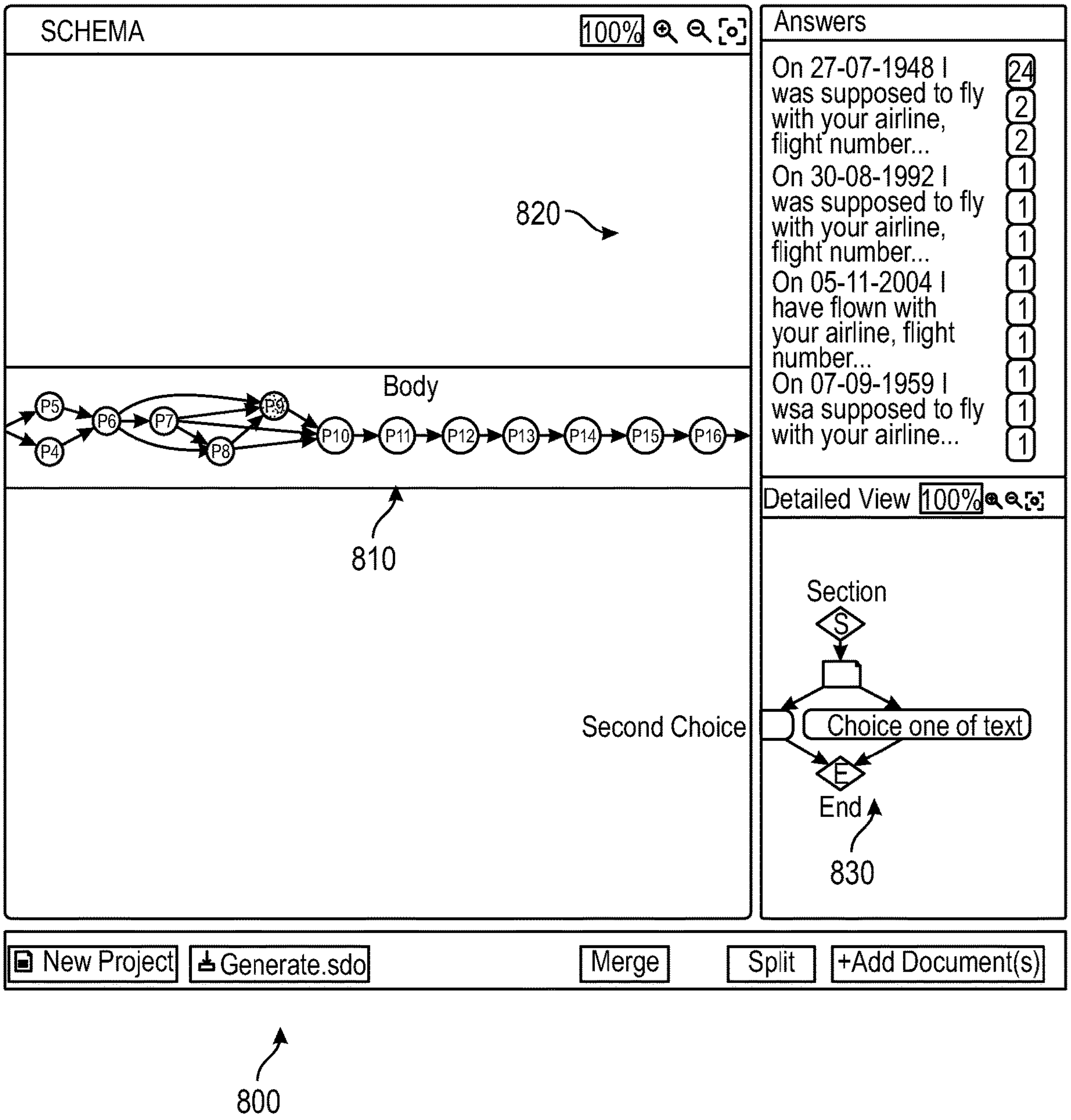
FIG. 8 is an exploded view of an example output of an artificial intelligence processor, according to one embodiment.

The stage 4, 240, automatic assembly of the document template and flow charts can be described as follows. For example, FIG. 8 shows that the fragments of text are captured and assembled in a flow chart for easy review. The automatic assembly allows for splitting a section from a document. Allows for drag and drop to change the flow. All documents grouped together are listed and associated with a single document template and associated flow chart. Fragments that were not helpful are also listed to be discarded. The automatic assembly can be split or merged based on user input.

In one embodiment, different fragments that are substantively same but with varying differences are clubbed together. A person of ordinary skill in the art would understand that this is more than text pattern matching. The artificial intelligence processor makes a determination as to what text is substantially the same even if the text does not match word to word.

The stage 5, 250, adding new documents for input later and show differences with the template can be described as follows. Newly created documents can be an extra feed for the AI diagram for one template. Based on this new input an existing diagram (and possibly tweaked by a consultant) will be changed. New paragraphs and selections will be highlighted. The consultant can except or reject new changes. When changes are excepted then a new version of the AI diagram of the template will be saved.

Figure 3:
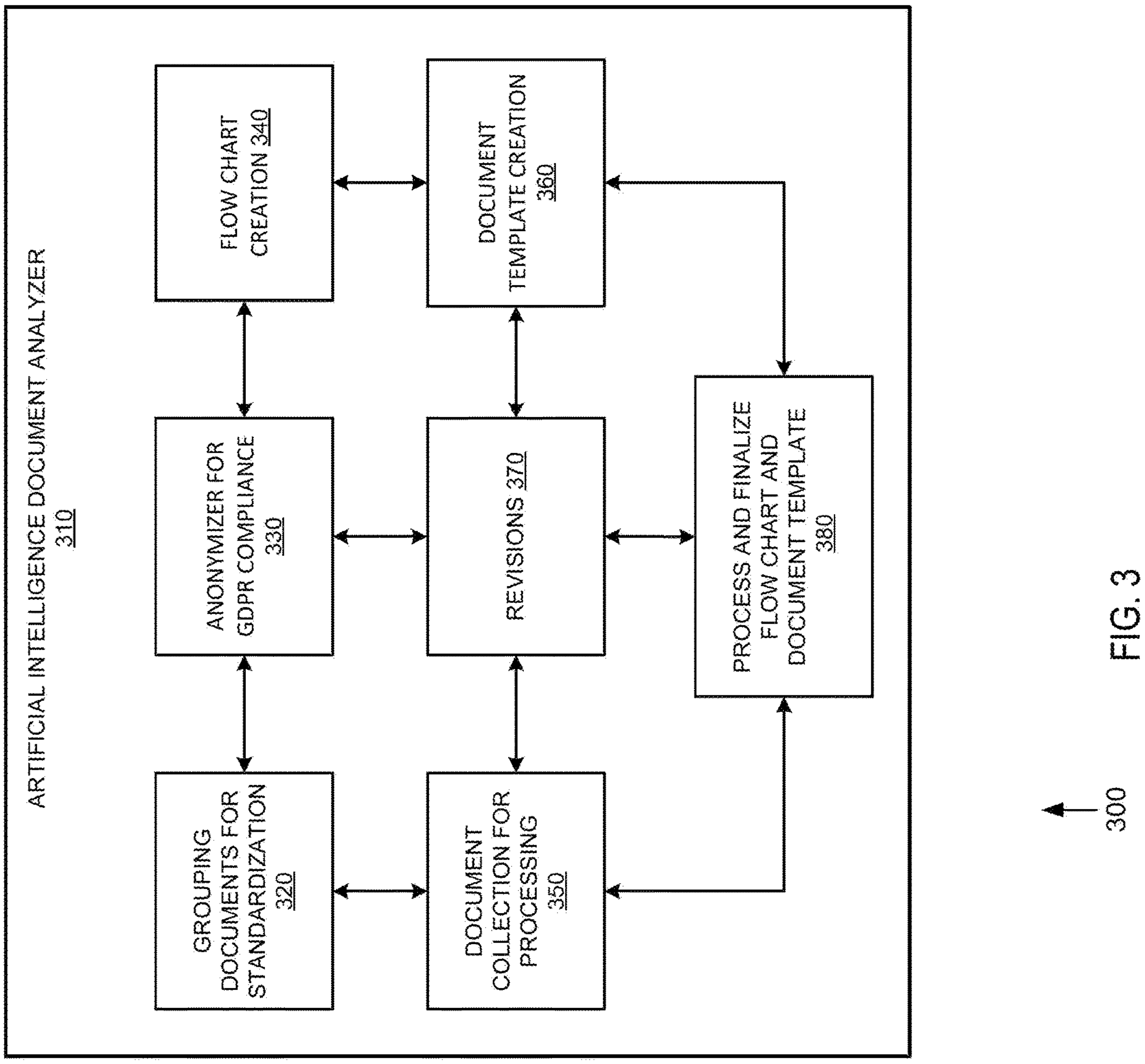
FIG. 3 is an exploded view of different modules included in the systems and methods of creating document templates for a collection of documents from the perspective of an artificial intelligence processor, according to one embodiment.

FIG. 3 can be described as follows. Different software or hardware modules and functions of artificial intelligence document analyzer 310 is described here. The artificial intelligence document analyzer 310 is an embodiment of the artificial intelligence processor 160 of FIG. 1. At 350, the documents are collected from different departments and individuals. Documents can be collected from storage servers or individual personal computers.

The artificial intelligence processor analyzes the collected documents and divides them into groups of documents for standardization at 320. The granularity of differences between the groups of documents can be set by the management at the organization. For example, one group may collect all documents that relate to marketing of a product. Another group may collect all documents related to an accessory of that product. The organization may decide to club those group of documents together losing the granularity in differences in addressing those groups.

After grouping of documents, the documents are run through an anonymizer to remove personal and sensitive information for Global Data Protection Regulation (GDPR) compliance, as shown in FIG. 3 at 330. This ensures that the document templates created do not have sensitive information. The original documents are untouched and maintain the same level of confidentiality. The analyzer is processing documents for efficiency and document template creation.

At 340 flow chart is created and assembled based on the analyzer's determination as to what fragments are relevant and most used. Unused fragments are also collected. Drag and drop feature can be used to revise the flow chart. At 360, the document template creation occurs that is followed by the flow chart creation. If needed, a questionnaire is created to fill in certain fields. An overall big picture visual of all the documents processed, flow chart and document templates created can also be generated for audit or reporting purposes.

At 370, any manual revisions can occur to train the analyzer further. At this stage additional new documents can also be given for processing. This allows analyzer to generate differences and incrementally incorporate the differences as approved into the flow charts and document templates. At 380, the process of analyzing is completed and the finalized document templates are propagated to the end-user systems.

The analyzer 310 can include additional functional features that include anonymize existing documents to prepare for processing by AI that occurs earlier in the processing or later depending on customer preference. Additional customer downloads tools that lets output be checked by customer. Reporting on paragraphs that are similar through the whole document. User interface to create follow up questions. User interface to create similar follow up questions. Customized sections that include for example, addressee area similar to use in mail merge. A report on analyzing tables, pictures, video segments that are separate from word processing.

FIG. 4 can be described as follows. Selected is the 8th paragraph from a group of documents. On the right side of the screen 410, shows the content of this paragraph extracted from all selected documents. Translation of this content: On 27 Jul. 1948 I was supposed to fly with your airline, flight number. On 30 Aug. 1992 I was supposed to fly with your airline, flight number. On May 11, 2004 I have flown with your airline, flight number. On Jul. 9, 1959 I was supposed to fly with your airline, flight number. On 27 Jul. 1962 I have flown with your airline, flight number. On Feb. 5, 1923 I was supposed to fly with your airline, flight number. On 24 May 1925 I have flown with your airline, flight number.

Below that at 430 shows a diagram with fixed text, variables and choices the AI found in this paragraph. Translation of this diagram: Choice between "I have flown" and "I was supposed to fly." Next is fixed text: "with your airline, flight number/" Next is free text: the flight number. Next is fixed text: ". This flight was." Next is a choice between "cancelled", "delayed" or "overbooked." At 420, the flow chart of the entire document and not just paragraph 8 is shown. A user can work within a section or look at the overall flow chart for that document template.

Figure 5:
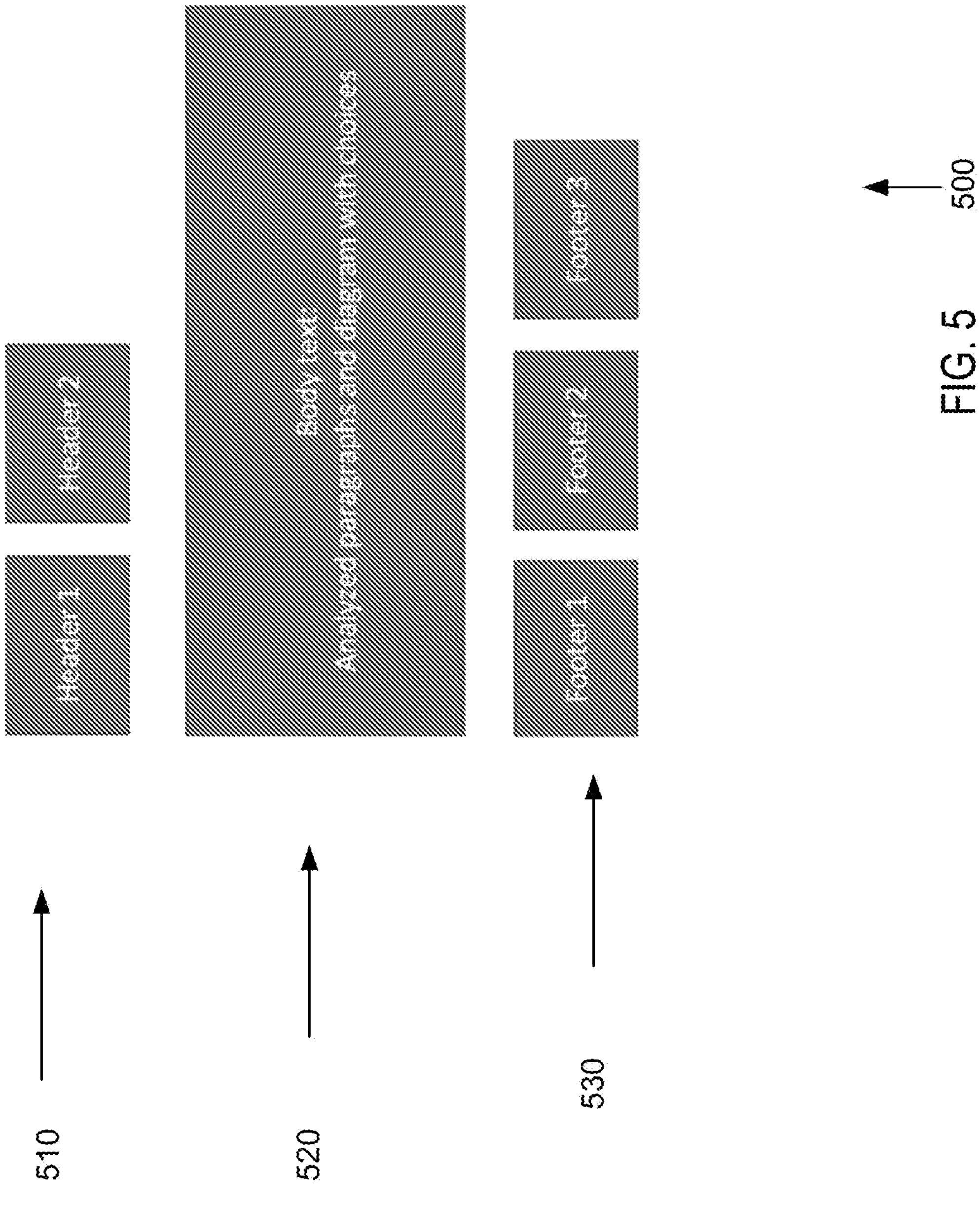
FIG. 5 is an exploded view of different sections in a flow chart or document template, according to one embodiment.

FIG. 5 is a view 500 of different sections in document template. The Artificial Intelligence analytics tool divides multiple headers and footers from the body text. The body text is presented as a string of paragraphs. There can be multiple possibilities of a paragraph at the same position in the document as shown on the left side in the Smart AI picture, as shown in FIG. 4 at 420. Per paragraph there could be several sub-questions which results in different outcome in the document. At 510, the AI has discovered two different headers, i.e., header is shown to have two sub-sections header 1 and header 2. At 520, is the body text which has the analyzed paragraphs and diagram with different choices. The body text can be related to header 1 or header 2 or ask the end user later to make that choice when it wants to generate a document based on the template. At 530, AI has discovered three different footers, i.e., the footer has three sub-sections footer 1, footer 2 and footer 3. The body text can be related to footer 1, 2 or 3 or ask the end user later to make that choice when it wants to generate a document based on the template.

Figure 6:
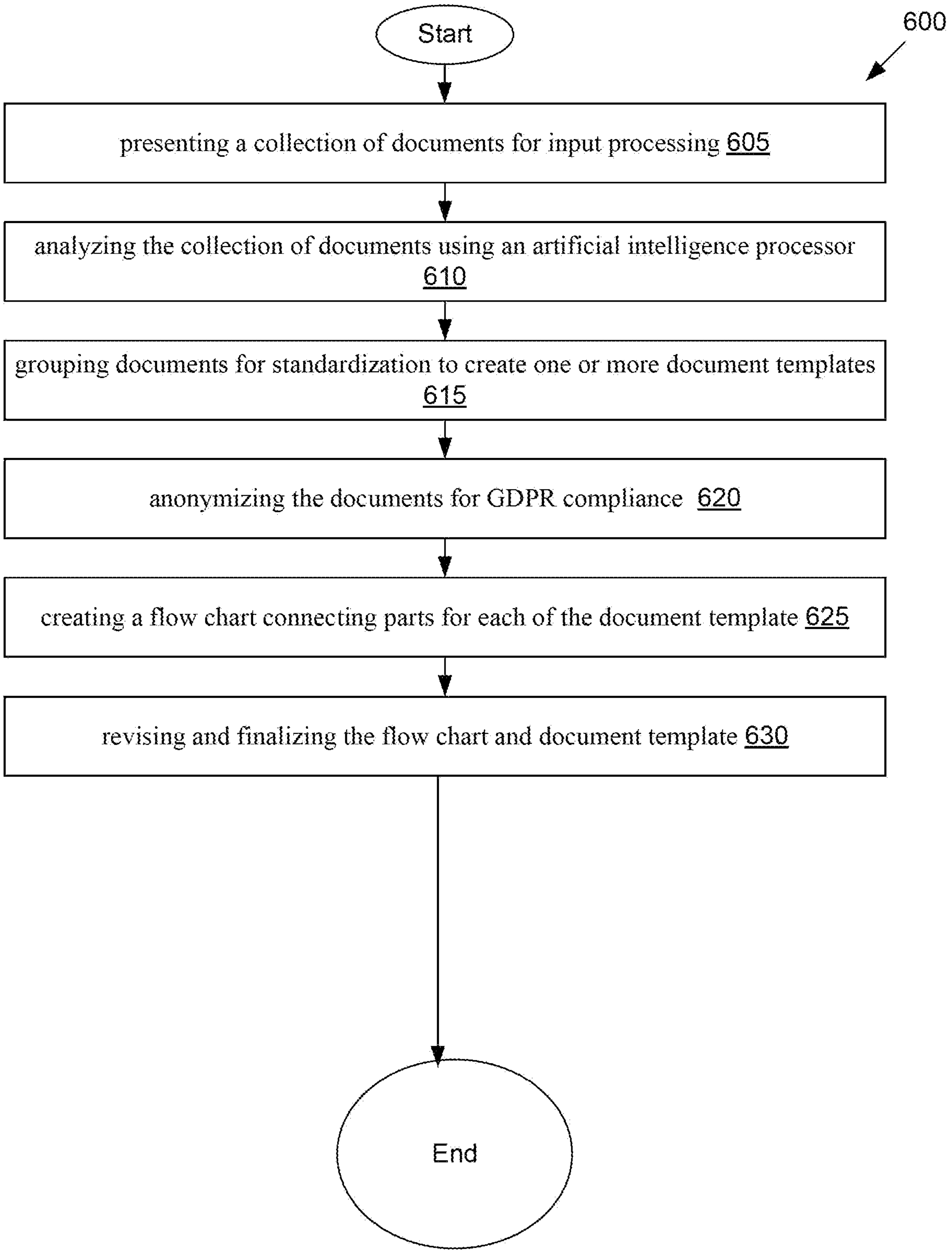
FIG. 6 shows a flowchart illustrating an example of the systems and methods of creating document templates for a collection of documents, according to one embodiment.

FIG. 6 shows a flowchart 600 illustrating an example of the systems and methods of document template for a collection of documents, according to one embodiment. The flowchart 600 is discussed in conjunction with the environment shown in the diagram 100 in FIG. 1. At block 605, begins with presenting a collection of documents for input processing. The documents collected can be in different formats and of different document types. In one embodiment, a scanner is used to scan all paper copies of the documents and create them in digital format before presenting to input for processing. At block 610, analyzing the collection of documents using an artificial intelligence processor. The artificial intelligence processor can analyze using the functions described in FIG. 3, according to one embodiment. At 615, grouping of documents occurs for standardization to create one or more document templates. At 620, anonymizing the documents for GDPR compliance occurs. At 625, creating a flow chart connecting parts for each of the document template section occurs. At 630, revising and finalizing the flow chart and document template occurs.

In one embodiment, the revising includes drag and drop of different fragments in a graphical user interface. In one embodiment, the document template includes a questionnaire that helps easy input to the variable fields. The artificial intelligence processor learns from the manual tweaking.

In one embodiment, additional documents are given for processing that are compared to the document templates already created. The artificial intelligence processor learns from the differences to create revised document templates.

In one embodiment, the section of a document template or a flow chart includes one or more variables, one or more data fields, formatting style and font style information. In one embodiment, document templates are created based on different roles in different departments within an organization. For example, marketing team may have a different default profile setting than someone in engineering. In one embodiment, two individuals within a team can customize their profile from the default settings to have their individualized preference. In one embodiment, an organization may allow different settings to be overridden by individual preferences. In one embodiment, an organization may restrict the changes to a profile setting to give a uniform look and feel for all documents generated within that organization. In one embodiment, documents with different look and feel are still organized together and merged within a single document template.

In a broad embodiment, the invention is systems and methods of creating document templates from a collection of documents to provide for customized document templates that can be manually revised as well as upgraded as time progress with additional documents collected. The system allows implementation of multiple document templates within an organization that can be seamlessly propagated to users across the organization.

Figure 7:
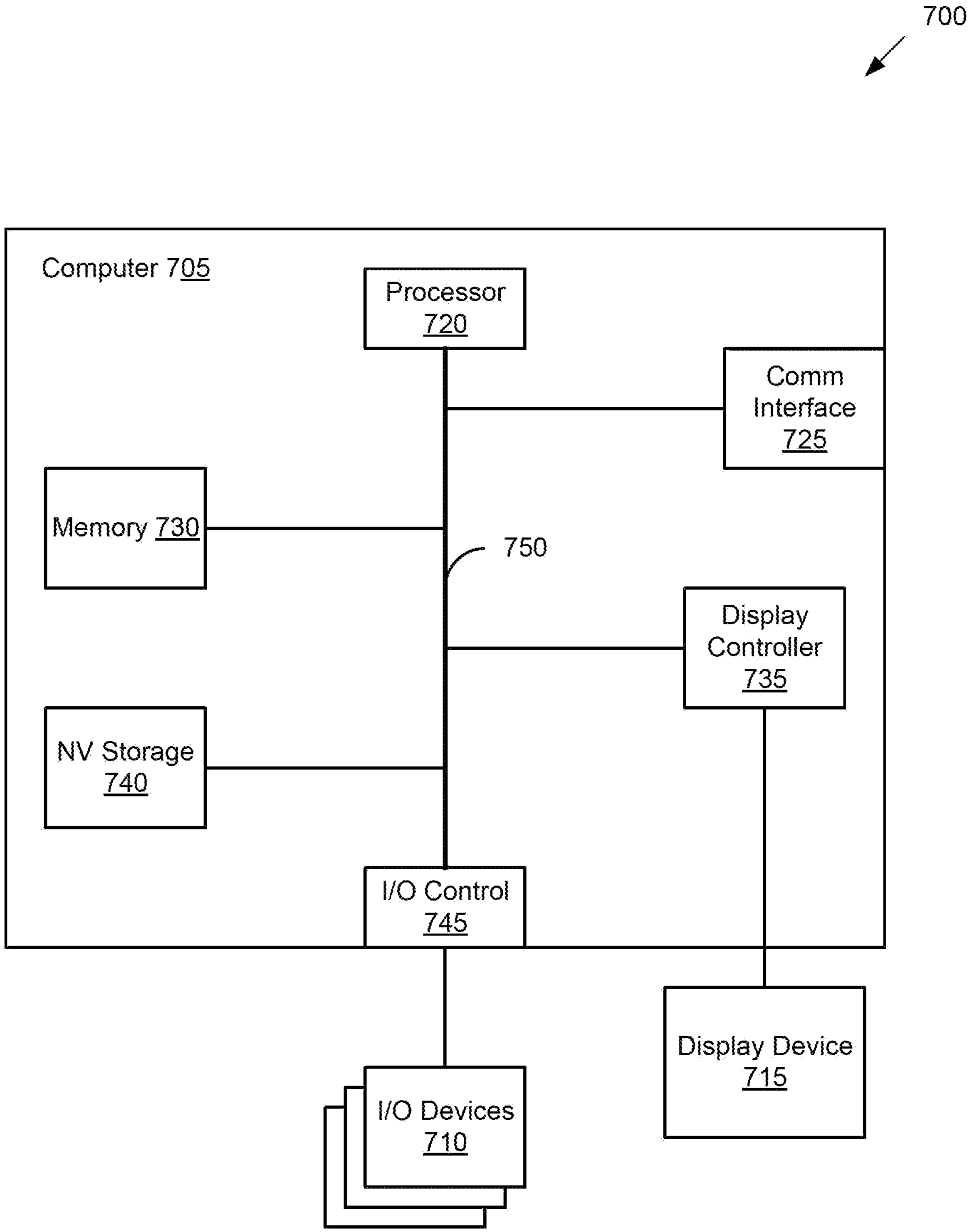
FIG. 7 is a schematic diagram of exemplary computing devices that can be used to implement the methods and systems disclosed herein, according to one embodiment.

FIG. 7 is a schematic diagram of computing device 700 that can be used to implement the methods and systems disclosed herein, according to one or more embodiments. FIG. 7 is a schematic of a computing device 700 that can be used to perform and/or implement any of the embodiments disclosed herein. In one or more embodiments, IoT device 110, Software Development Kit (SDK)/API 120, Speak-to-IoT system 130, voice assistants, user end devices with mobile apps 150 of FIG. 1 may be the computing device 700.

The computing device 700 may represent various forms of digital computers, such as laptops, desktops, workstations, personal digital assistants, servers, blade servers, mainframes, and/or other appropriate computers. The computing device 700 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

FIG. 7 shows an example of a computing device 700 on which techniques described here can be implemented. The computing device 700 can be a conventional computer system that can be used as a client computer system, such as a wireless client or a workstation, or a server computer system. The computing device 700 includes a computer 705, Input/Output (I/O) devices 710, and a display device 715. The computer 705 includes a processor 720, a communications interface 725, memory 730, display controller 735, non-volatile storage 740, and I/O controller 745. The computer 705 may be coupled to or include the I/O devices 710 and display device 715.

The computer 705 interfaces to external systems through the communications interface 725, which may include a modem or network interface. It will be appreciated that the communications interface 725 can be considered to be part of the computing device 700 or a part of the computer 705. The communications interface 725 can be an analog modem, Integrated Services for Digital Networks ("ISDN") modem, cable modem, token ring interface, satellite transmission interface (e.g. "direct personal computer" also known as "direct PC"), or other interfaces for coupling a computer system to other computer systems.

The processor 720 may be, for example, a conventional microprocessor such as an Intel Pentium microprocessor or Motorola power PC microprocessor. The memory 730 is coupled to the processor 720 by a bus 750. The memory 730 can be Dynamic Random Access Memory (DRAM) and can also include Static RAM (SRAM). The bus 750 couples the processor 720 to the memory 730, also to the non-volatile storage 740, to the display controller 735, and to the I/O controller 745.

The I/O devices 710 can include a keyboard, disk drives, printers, a scanner, and other input and output devices, including a mouse or other pointing device. The display controller 735 may control in the conventional manner a display on the display device 715, which can be, for example, a cathode ray tube (CRT) or liquid crystal display (LCD). The display controller 735 and the I/O controller 745 can be implemented with conventional well-known technology.

The non-volatile storage 740 is often a magnetic hard disk, a solid state disk, an optical disk, or another form of storage for large amounts of data. Some of this data is often written, by a direct memory access process, into memory 730 during execution of software in the computer 705. One of skill in the art will immediately recognize that the terms "machine-readable medium" or "computer-readable medium" includes any type of storage device that is accessible by the processor 720 and also encompasses a carrier wave that encodes a data signal.

The computing device 700 is one example of many possible computer systems that have different architectures. For example, personal computers based on an Intel microprocessor often have multiple buses, one of which can be an I/O bus for the peripherals and one that directly connects the processor 720 and the memory 730 (often referred to as a memory bus). The buses are connected together through bridge components that perform any necessary translation due to differing bus protocols.

Network computers are another type of computer system that can be used in conjunction with the teachings described here. Network computers do not usually include a hard disk or other mass storage, and the executable programs are loaded from a network connection into the memory 730 for execution by the processor 720. A Web TV system, which is known in the art, is also considered to be a computer system, but it may lack some of the components shown in FIG. 7, such as certain input or output devices. A typical computer system will usually include at least a processor, memory, and a bus coupling the memory to the processor.

Though FIG. 7 shows an example of the computing device 700, it is noted that the term "computer system," as used here, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. An example of a computer system is shown in FIG. 7.

The memory can include, by way of example but not limitation, random access memory (RAM), such as dynamic RAM (DRAM) and static RAM (SRAM). The memory can be local, remote, or distributed. As used here, the term "computer-readable storage medium" is intended to include only physical media, such as memory. As used here, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a Compact Disc Read Only Memory (CD-ROM), Erasable Programmable Read Only Memory (EPROM), or Electrically Erasable Programmable Read Only Memory (EEPROM), a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory here. Even when software is moved to the memory for execution, the processor will typically make use of hardware registers to store values associated with the software, and local cache that, ideally, serves to speed up execution. As used here, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

A person of ordinary skill in the art would appreciate that flexible and customizable document template creation as disclosed herein includes network wide control and flexibility as well as individual level control and flexibility without having direct control of a department, organization or end-user.

FIG. 8 is an exploded view 800 of a section of the flow chart that is assembled for a section of a document. At 810, is the flow chart for the entire document. At 830, is the section of the selected flow chart. At 820, are the fragments of text and different text options that go with the flow chart. This figure is generated by splitting a section of the document. This single paragraph can be split into two paragraphs.

Figure 9:
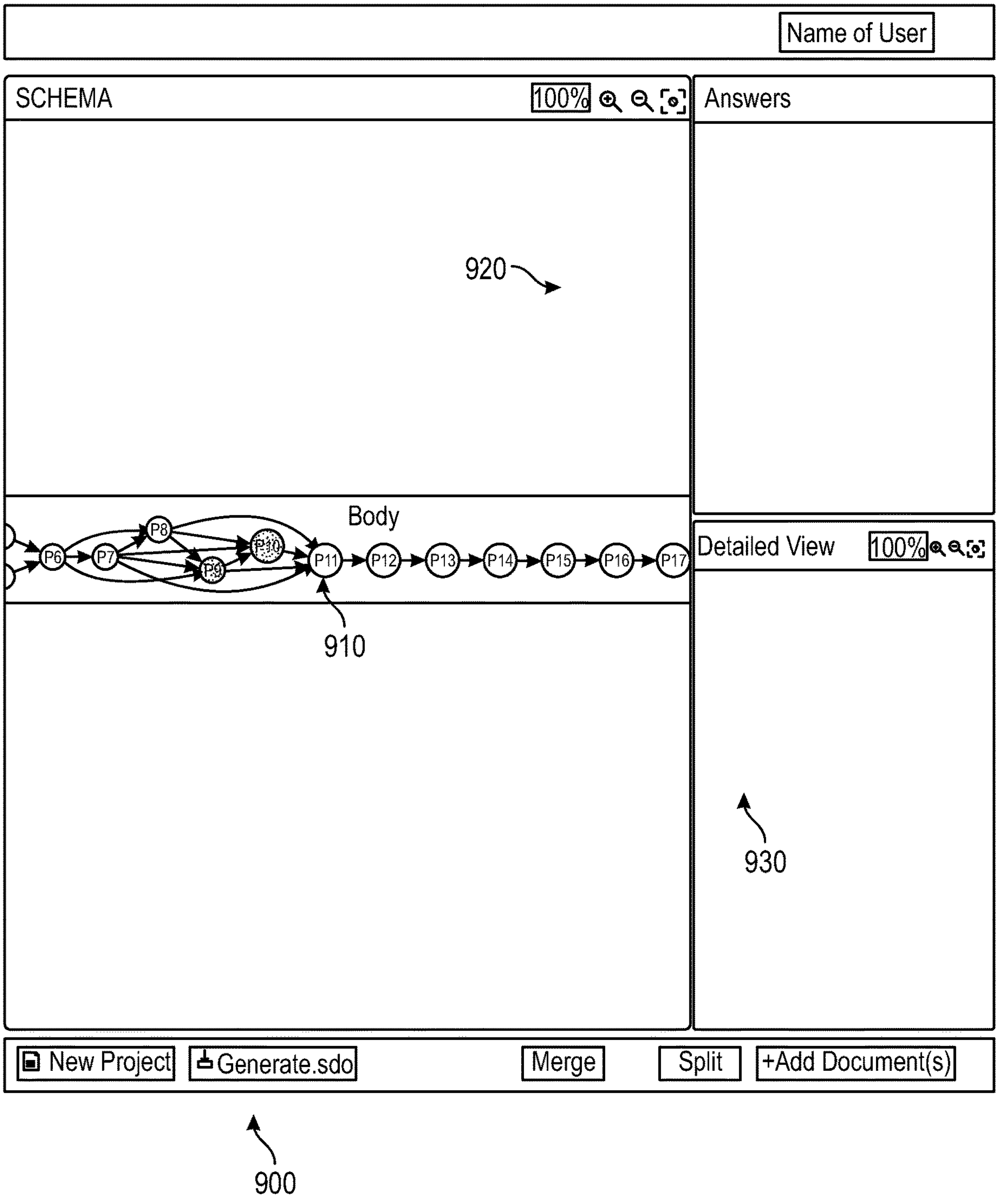
FIG. 9 is an exploded second view of an example output of an artificial intelligence processor, according to one embodiment.
Figure 16:
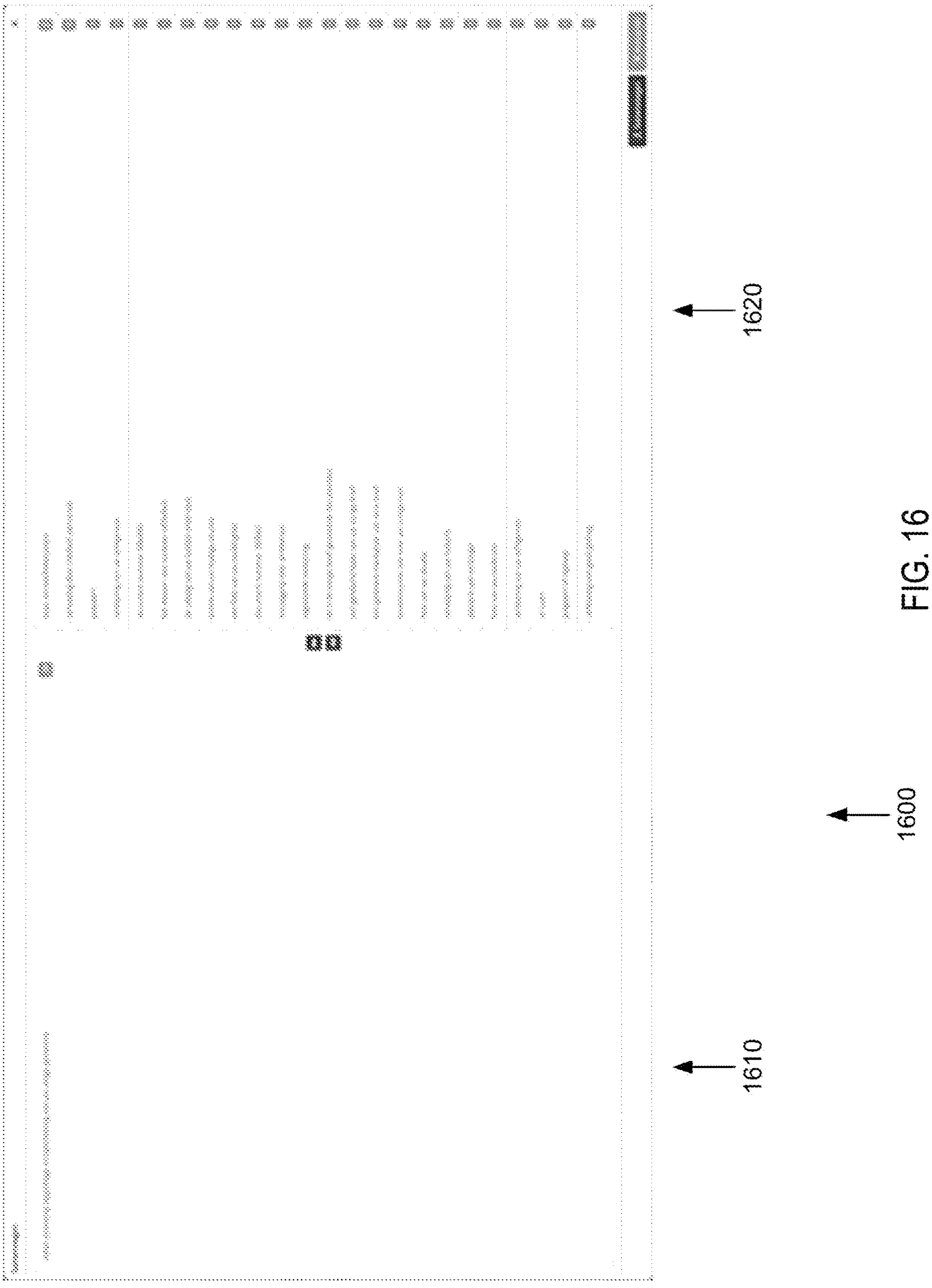
FIG. 16 is an example view of merging answer texts to one selection question within a diagram (diagram of paragraphs as in FIGS. 4 and 12), according to one embodiment.

FIG. 9 is an exploded second view of the assembled flow chart. In the picture we see the result of the split action from FIG. 8: paragraph 10 was created in the diagram. The other possibility is to merge 2 paragraphs. In the picture at 910, paragraph 9 and 10 are selected and the consultant presses the button "Samenvoegen" which means "merge." If the button is pressed to merge, the flowchart disappears. On the left side of FIG. 16 we see 28 fragments with the same text and many different fragments on the right screen. All these fragments together should be the selection options for one paragraph. When we drag the 28 fragments from the left to the right and press "merge". The two paragraphs 9 and 10 will be merged together again and the situation that we had at the beginning is restored. This is shown in FIG. 16. At 1610, the flow chart disappears and 1620 shows the merged list of fragment texts.

FIG. 10 is an exploded view 1000 of list of documents collected. At 1010, shows the pointer location for the document, 1020 is the name of the document, 1030 gives date of creation or last modification of that document, 1040 gives the size of the document, and 1050 gives the document type. At 1060, one of the documents is selected. All the documents are grouped together basically giving reasons to customer on flight cost compensation. Since this is customer support document that is outward facing, the organization may want uniformity in its response. This document could also have legal ramifications to the organization. In one embodiment, the collected documents could be in different languages but having the same content.

Figure 11:
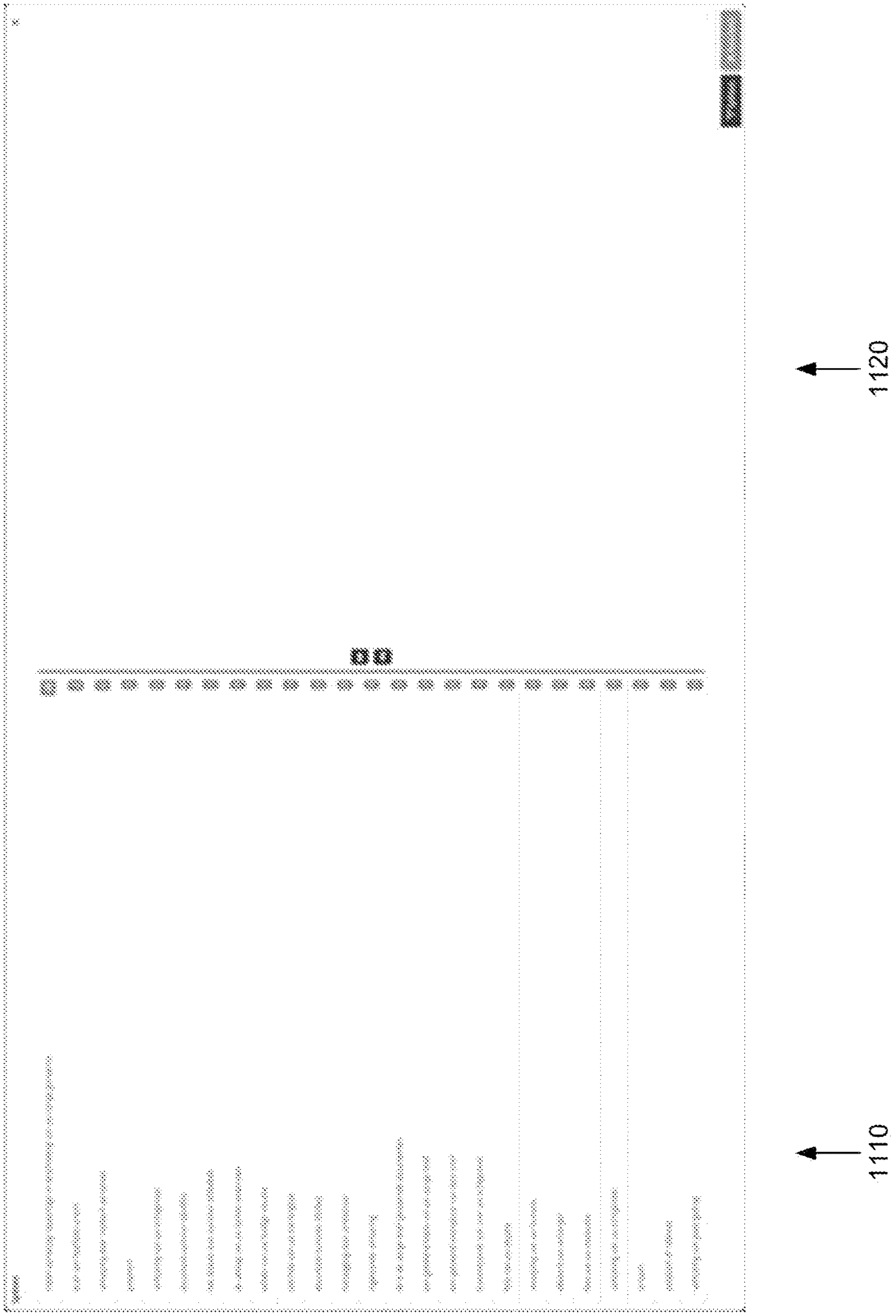
FIG. 11 is an example view of splitting answer texts into two selection questions within a diagram (diagram of paragraphs as in FIGS. 4 and 12), according to one embodiment.

FIG. 11 is an exploded view 1100 of allowing drag and drop of fragments of text into the flow chart. On the left the text fragments 1110 that were found in paragraph 9 (selected from FIG. 9) through all the documents are shown. The consultant can select one or more text fragments and can drag them to the right side 1120. All fragments on the right sight will then be put in a new paragraph.

Figure 12:
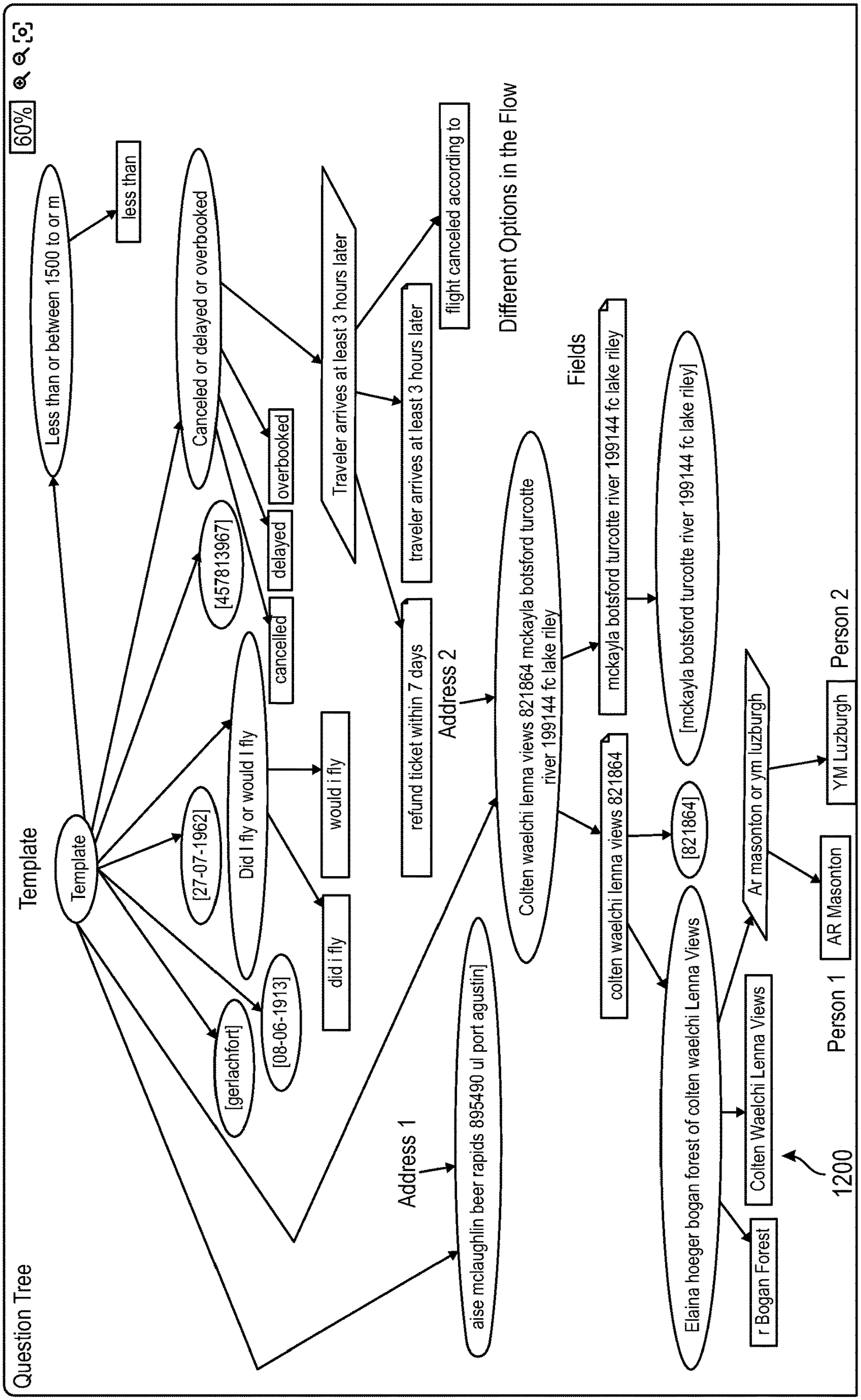
FIG. 12 is an exploded view of a flow chart, according to one embodiment.
Figure 13:
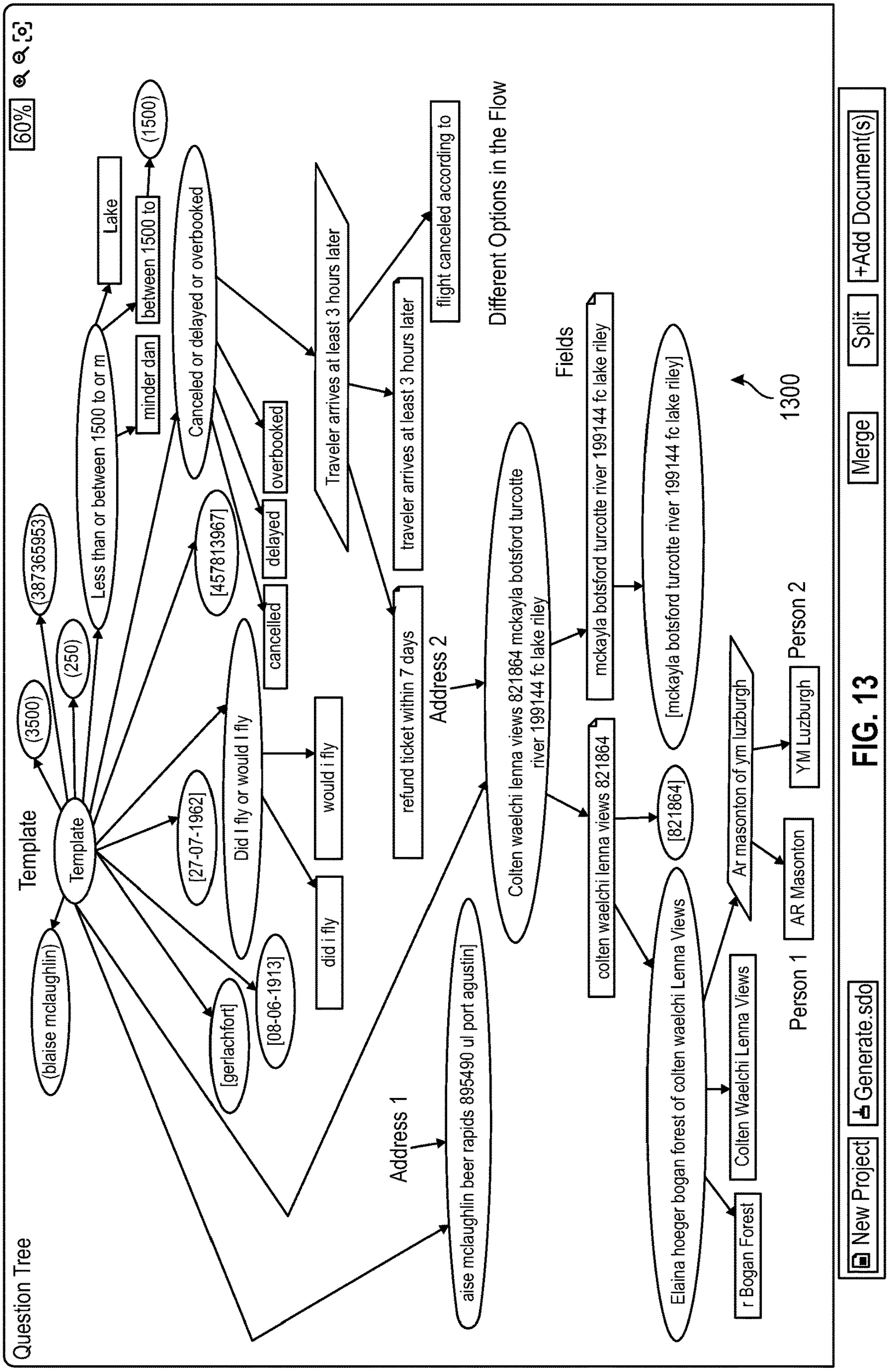
FIG. 13 is an exploded second view of a flow chart, according to one embodiment.

FIG. 12 is an exploded view 1200 of a flow chart with many different sections for a document template. FIG. 13 is the second exploded view of the flow chart from FIG. 12. Both Figures together show that depending on the complexity of the document, different flow chart visualizations occur. The system also allows visualization and graphics of all document templates generated for an organization.

Figure 14:
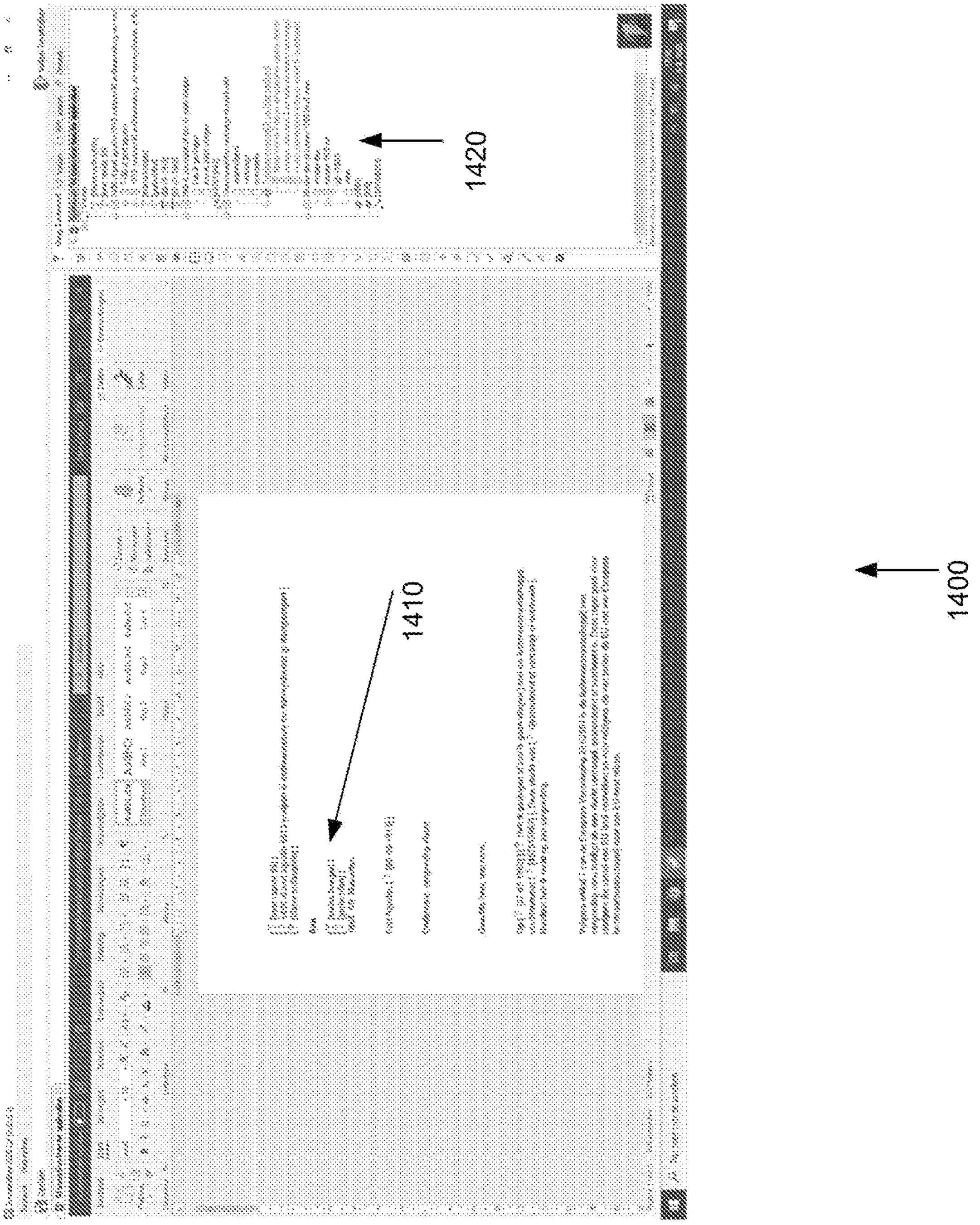
FIG. 14 is an exploded view of a document template, according to one embodiment.
Figure 15:
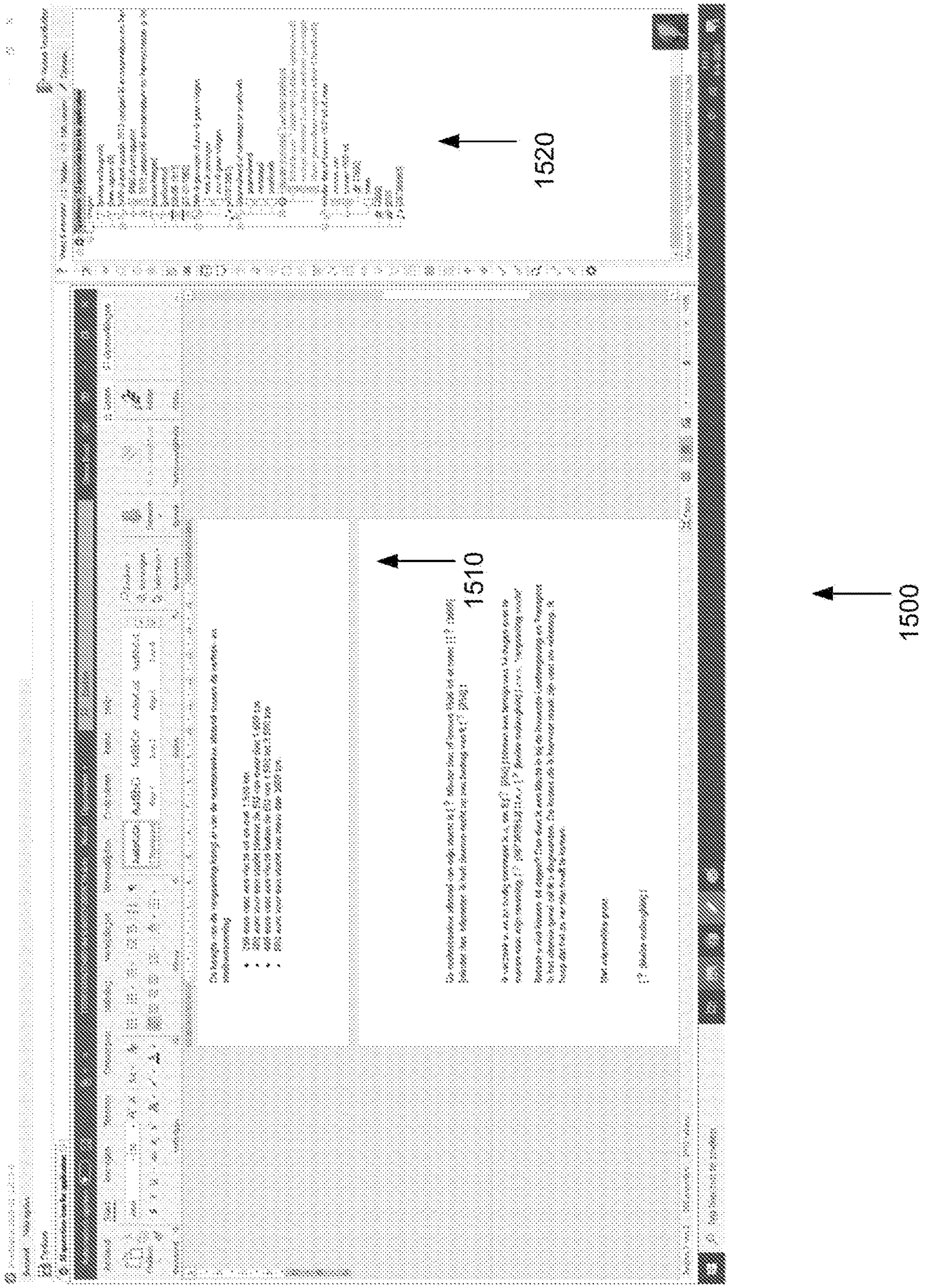
FIG. 15 is an exploded view of a second part of a document template, according to one embodiment.

FIG. 14 is an exploded view 1400 of a document template that is editable. FIG. 15 is the second half of the same document template that is editable. At 1410 the document is shown with questions marks that can be filled in with text fragments from the right side 1420. Similarly, in FIG. 15 at 1510 is the document template with different fields that can be filled in with the right side 1520.

Figure 17:
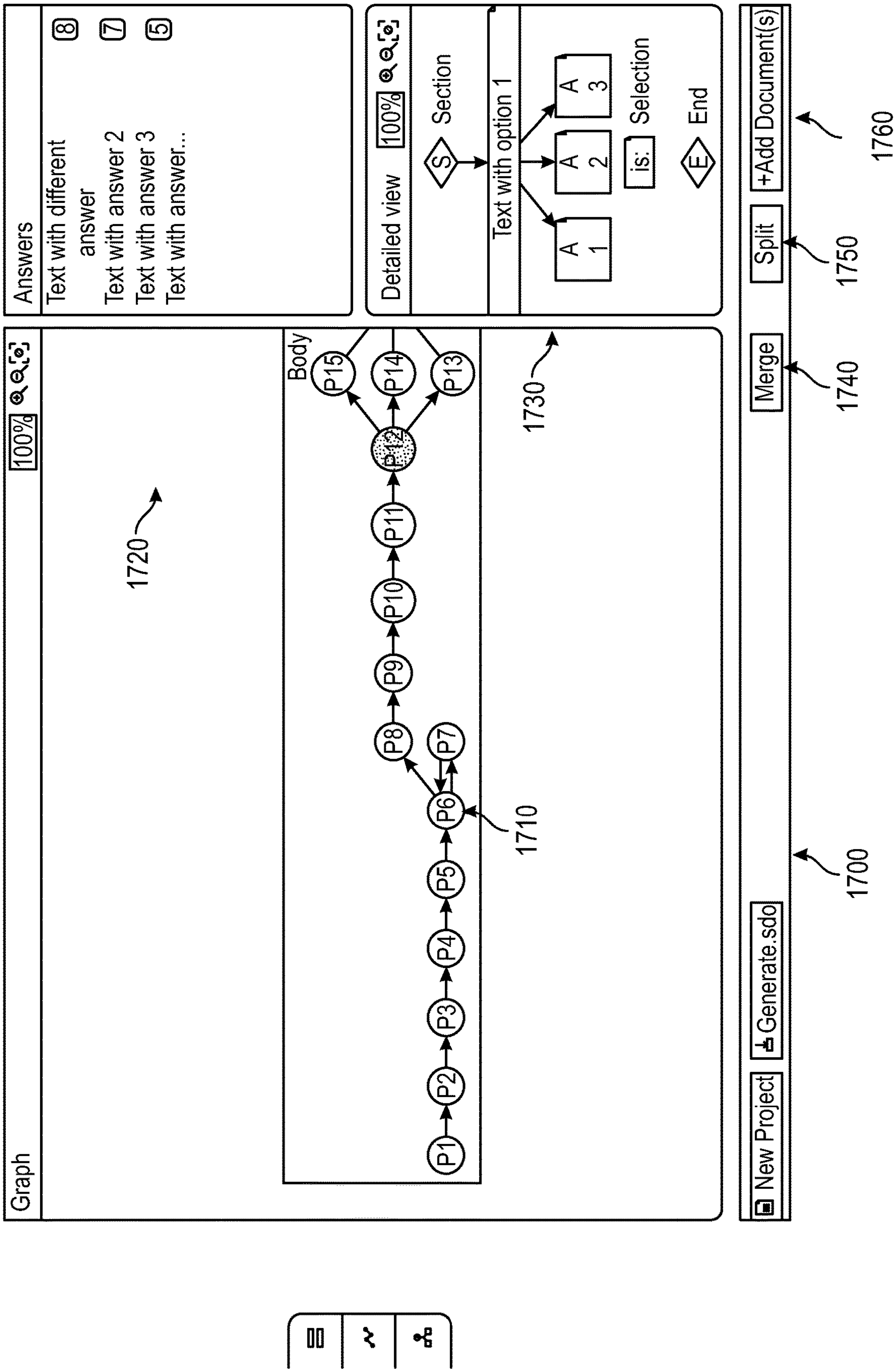
FIG. 17 is an exploded view of an example output of an artificial intelligence processor, according to one embodiment.

FIG. 17 is an exploded view 1700 of a section of the flow chart that is assembled for a section of a document. At 1710, is the flow chart for the entire document. At 1730, is the section of the selected flow chart. At 1720, are the fragments of text and different text options that go with the flow chart. At 1740, there is a button to merge different paragraphs. At 1750, a paragraph can be split into two options. At 1760, additional documents can be added to revise this flow chart and document template.

Figure 18:
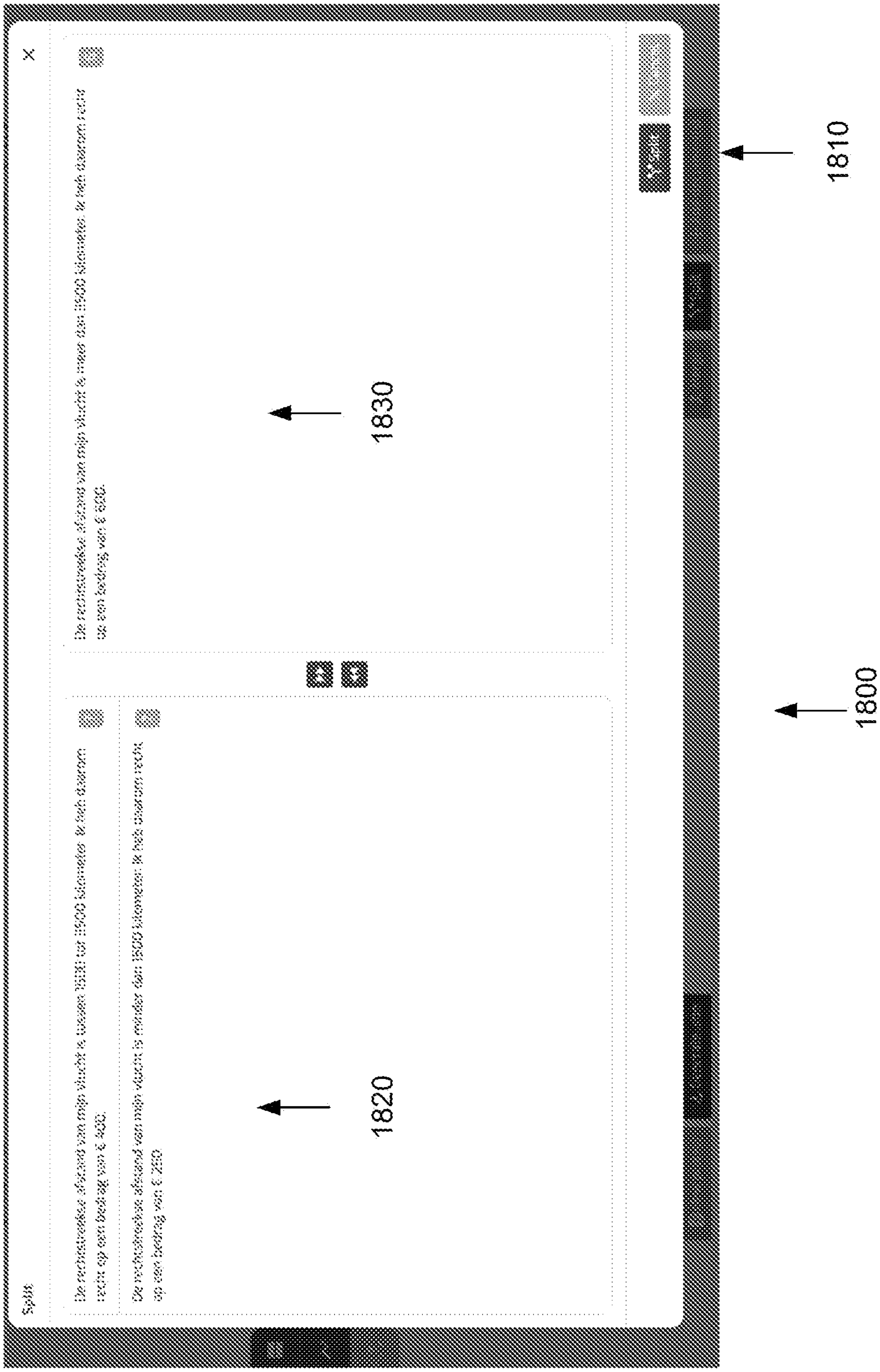
FIG. 18 is an example view of splitting questionnaire options, according to one embodiment.

FIG. 18 is an example view 1800 of splitting paragraphs. At 1810, is a button that allows different text fragments to be split into different paragraphs that are displayed as different options in a document template. At 1820, are the different options. At 1830, is the final selected option that is incorporated into the template.

In one embodiment, the process also includes checklist that is invoked at the beginning of the document template creation to allow for flexible rules of template creation.

While the examples herein are shown for network that is largely used in document processing, a person of ordinary skill in the art would understand that the disclosure can be applied to different types of flow chart creations that can also be used to give an organization a big picture view for statistical analysis. The invention described herein allows for easy data analysis of large scale data while providing opportunities for the analyzer to learn as time progresses including accepting manual feedback.

Several components described here, including clients, servers, and engines, can be compatible with or implemented using a cloud-based computing system. As used here, an overlay network including, for example, a peer to peer network, is a system that provides computing resources, software, and/or information to client systems by maintaining de-centralized services and resources that the client systems can access over a communications interface, such as a network. A person of ordinary skill in the art would understand that different modules or components described herein could be implemented using a cloud-based computing system. Such systems can involve a subscription for services or use a utility pricing model. Users can access the protocols of the distribution network through a web browser or other container application located on their client system.

The invention disclosure describes techniques that those of skill in the art can implement in numerous ways. For instance, those of skill in the art can implement the techniques described here using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used here, the term 'processor' refers to one or more devices, circuits, and/or processing cores configured to process data, such as computer program instructions.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described here relate to apparatus for performing the operations. The apparatus can be specially constructed for the required purposes, or it can comprise a general-purpose computer selectively activated or reconfigured by a computer program stored in the computer. Such a computer program may be stored in a computer-readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus. Although the foregoing implementations have been described in some detail for purposes of clarity of understanding, implementations are not necessarily limited to the details provided.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order. The structures and modules in the figures may be shown as distinct and communicating with only a few specific structures and not others. The structures may be merged with each other, may perform overlapping functions, and may communicate with other structures not shown to be connected in the figures.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tapes, disks, integrated circuits, and servers. The instructions are operational when executed by the processor to direct the processor to operate in accord with some embodiments. Those skilled in the art are familiar with instructions, processor(s), and storage medium.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The structures and modules in the figures may be shown as distinct and communicating with only a few specific structures and not others. The structures may be merged with each other, may perform overlapping functions, and may communicate with other structures not shown to be connected in the figures.

The invention claimed is:

1. A method of creating document templates for a collection of documents, comprising:

presenting a collection of documents of varied types and at least a thousand for input processing;

analyzing the collection of documents using an artificial intelligence processor;

grouping the collection of documents for standardization to create one or more document templates for each group after analyzing the collection of documents;

anonymizing the collection of documents for General Data Protection Regulation (GDPR) compliance after grouping documents for standardization based on the type of data collected;

creating a flow chart displaying a status report on the collection of documents processed, that is separate from the one or more document templates for user bi-directional feedback, connecting parts for each of the document template wherein each of the document template includes: a header section, a footer section, and one or more body text sections;

wherein each header, footer and body text section includes: one or more variables; one or more data fields; formatting style; and font style;

wherein the flow chart provides a graphical user interface with drag and drop features representing the document templates standardized for the collection of documents; and wherein the artificial intelligence processor incorporates user feedback and steps in the flow chart creation for a next collection of documents.

2. The method of claim 1, further comprising: receiving manual input to train the artificial intelligence processor.

3. The method of claim 1, further comprising: customizing document templates creation based on profiles within an organization.

4. The method of claim 1, further comprising: merging the document templates based on information fields that match in content and have varying format or font style.

5. The method of claim 1, further comprising: generating questions to match the flow chart for each of the document template for user input.

6. The method of claim 1, further comprising:

generating a visual graphics to display the collection of documents, the one or more groups of documents for standardization and the one or more document templates.

7. The method of claim 1, further comprising:

allowing drag and drop revisions to the flow chart or one of the document template.

8. The method of claim 1, further comprising:

adding new documents to the collection of documents after analyzing by the artificial intelligence processor is complete;

analyzing the differences between the new documents and the one or more document templates generated.

9. The method of claim 8, further comprising: merging the differences by revising the flow chart or one of the document templates.

10. The method of claim 1, further comprising: merging one of the document templates having same content and varying document types.

* * * * *